UNITED STATES PATENT OFFICE.

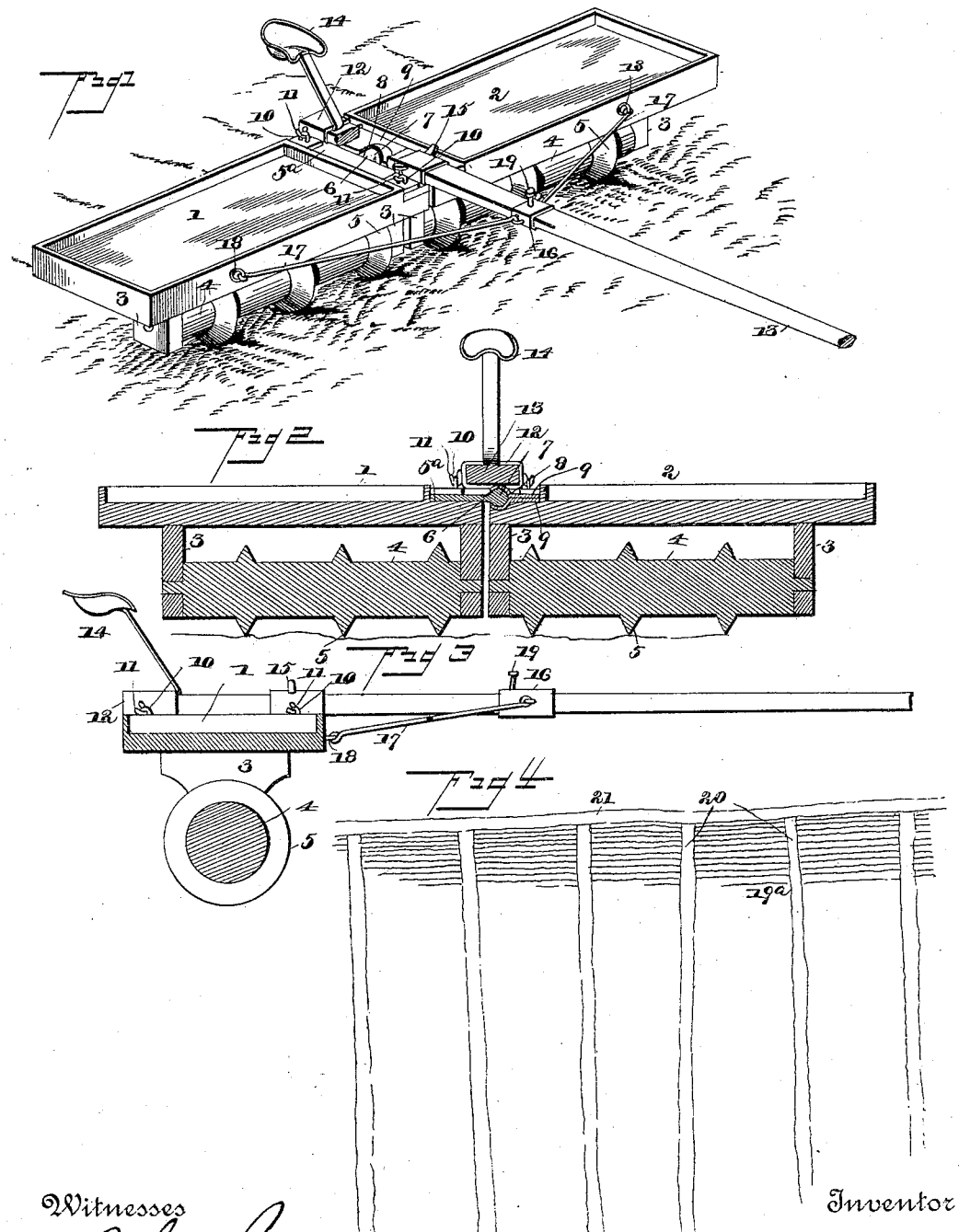

PETER VERLIFF, OF LA VETA, COLORADO.

COMBINED LAND ROLLER AND DITCHER.

SPECIFICATION forming part of Letters Patent No. 428,187, dated May 20, 1890.

Application filed November 15, 1889. Serial No. 330,431. (No model.)

*To all whom it may concern:*

Be it known that I, PETER VERLIFF, a citizen of the United States, residing at La Veta, in the county of Huerfano and State of Colorado, have invented a new and useful Combined Land Roller and Ditcher, of which the following is a specification.

This invention relates to a combined land roller and ditcher; and it has for its object to construct a machine which shall possess superior advantages in point of simplicity, durability, and general efficiency.

With these ends in view it consists in the improved construction, arrangement, and combination of parts, which will be hereinafter fully described, and particularly pointed out in the claims.

In the drawings hereto annexed, Figure 1 is a perspective view of a machine embodying my improvements. Fig. 2 is a transverse sectional view of the same, taken through the rollers. Fig. 3 is a longitudinal sectional view. Fig. 4 is a diagram illustrating the use of the machine.

Like numerals of reference denote like parts in all the figures.

1 2 designate two frames or platforms having hangers or brackets 3 3 on their under sides, in which are journaled the rollers 4 4. The latter, which may be constructed of cast-iron, are provided with annular V-shaped flanges 5 5, located a suitable distance—say about eighteen inches—apart.

To the upper side of one of the frames or platforms 1 is bolted or otherwise secured a plate $5^a$, having a laterally-extending shank 6, upon the outer extremity of which a ball 7 is formed. A socket 8, to receive this ball, is formed between a pair of plates 9 9, which are bolted to the upper side of the frame or platform 2. The plates 5 and 9 are provided with upwardly-extending hooks or staples 10 near their front and rear ends, adapted to be connected with hooks 11, formed upon collars 12, which are fitted upon the tongue 13. The latter is thereby connected loosely with the roller-frames, but in such a manner as to sustain the latter in a level position. The roller-frames at the same time are jointed universally by the ball-and-socket joint, and the said frames are thus capable of independent movement. The rearmost collar 12 upon the tongue supports the driver's seat 14. The collar next in front thereof has a stirrup 15 to support the driver's feet. Still another collar 16 is provided, which is connected by the draft-rods 17 with staples 18 upon the front sides of the frames or platforms. The collar 16 also has a pin or bolt 19 for the attachment of the draft.

In operation the frames or platforms may be loaded or weighted in any suitable manner. The weight of the driver also adds to the efficiency of the device. By the passage of the machine over the ground the soil is pressed or compacted and numerous small ditches $19^a$ will be formed, which should be intersected by irrigating-ditches 20, which are in turn intersected by the main supply-ditch 21, as will be seen in Fig. 4 of the drawings. By this system of ditching the land may be irrigated far more efficiently and with less water than where the ordinary method of irrigating by flooding the land is pursued. By the latter method the growth of the grain is also seriously checked, and there is much waste and loss by washouts, while by my improved method the ground and the small irrigating-ditches are compacted so as to hold the water and derive all the benefits thereof.

The universal joint by which the roller-carrying frames are connected permits said frames to move independently, thereby permitting the rollers to adapt themselves to any inequalities in the soil without danger of straining and breaking parts of the frame.

Having thus described my invention, I claim and desire to secure by Letters Patent of the United States—

1. The combination of the frames or platforms, the plates secured upon the same and having the ball and socket and provided with upwardly-extending hooks or staples, the tongue having collars provided with hooks engaging said hooks or staples, and the rollers journaled in hangers depending from said platforms, substantially as set forth.

2. The combination of the frames or platforms, the plates bolted upon the same and having the ball and socket and provided with upwardly-extending hooks or staples, the tongue having collars provided with hooks to engage the latter, the draft-rods connecting a collar upon the tongue with the front sides of the platforms, and the rollers journaled in brackets depending from the latter, substantially as set forth.

3. The combination of the roller-frames, the plates secured upon the same and having the ball and socket and provided with upwardly-extending hooks or staples, the tongue having collars provided with hooks engaging the latter, the driver's seat mounted upon the rear collar, the stirrup formed upon the collar in front of the driver's seat, and the draft-rods connecting an additional collar upon the tongue with the front sides of the roller-frames, substantially as set forth.

In testimony that I claim the foregoing as my own I have hereto affixed my signature in presence of two witnesses.

PETER VERLIFF.

Witnesses:
CHARLES SPIELMANN,
J. B. BOONE.